J. MORRIS.
AXLE SKEIN.
APPLICATION FILED MAY 15, 1917.

1,277,993.

Patented Sept. 3, 1918.

Inventor
John Morris

By Talbert & Parker
Attorneys

UNITED STATES PATENT OFFICE.

JOHN MORRIS, OF BEACH, VIRGINIA.

AXLE-SKEIN.

1,277,993.  Specification of Letters Patent.  Patented Sept. 3, 1918.

Application filed May 15, 1917. Serial No. 168,804.

*To all whom it may concern:*

Be it known that I, JOHN MORRIS, a citizen of the United States, residing at Beach, in the county of Chesterfield and State of Virginia, have invented certain useful Improvements in Axle-Skeins, of which the following is a specification, reference being had therein to the accompanying drawing.

The invention relates to an axle skein, and more particularly to the class of removable axle skeins and spindles for vehicles.

The primary object of the invention is the provision of a device of this character wherein the inner end of the axle skein is formed with a head having tongue and groove connection with the socketed housing or coupling sleeve of the axle spindle, and in this manner excluding dust, grit and other foreign matter from said axle.

Another object of the invention is the provision of a device of this character wherein the same can be mounted upon and removed from the axle with despatch.

A further object of the invention is the provision of a device of this character wherein the construction thereof is novel in form to assure maximum strength to the axle and to render the same dust-proof.

A still further object of the invention is the provision of a device of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings.

Similar reference characters indicate corresponding parts throughout the several views of the drawings.

Figure 1:
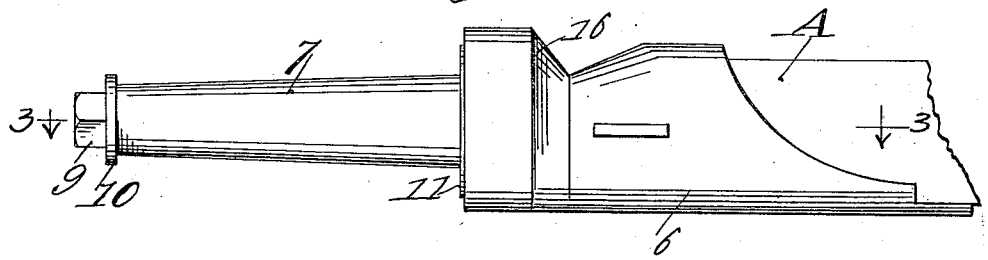
Figure 1 is a side elevation of the axle skein and spindle constructed in accordance with the invention.
Figure 2:
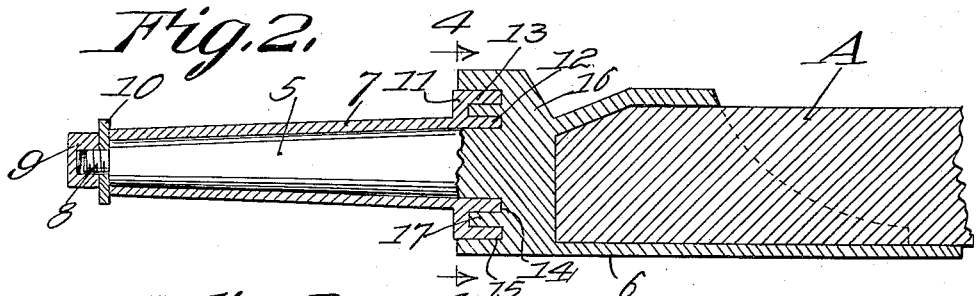
Fig. 2 is a vertical longitudinal sectional elevation thereof.
Figure 3:
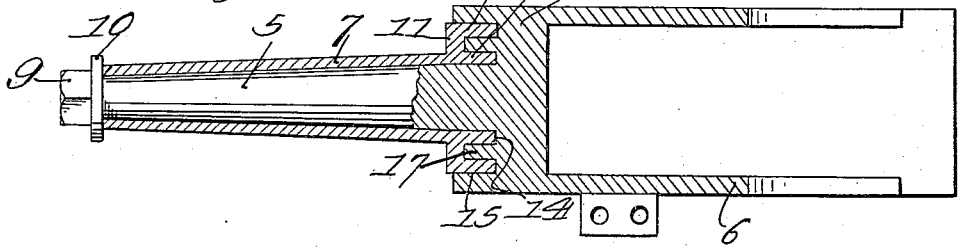
Fig. 3 is a sectional view on the line 3—3 of Fig. 1.
Figure 4:
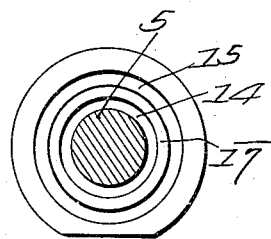
Fig 4 is a sectional view on the line 4—4 of Fig. 2.

Referring to the drawing in detail, A designates a portion of an axle bar and removably fitted on each end thereof is a spindle comprising the outwardly tapered spindle extension 5 which is formed integrally with a socketed housing or coupling sleeve 6 in which is received the end of the axle bar A, and upon the spindle extension 5 is removably fitted an axle skein hereinafter fully described.

The axle skein comprises an outwardly tapered tubiform member 7 which fits upon the extension 5, the tapered formation of the member 7 being identical to the tapered formation of the spindle extension 5, the outer end of the spindle extension 5 being formed with a reduced threaded extremity 8 on which is received a nut 9, the latter working against a washer 10 which loosely surrounds the reduced extremity 8 and plays against the outer end of the member 7, and in this manner the latter is held upon the spindle extension.

Formed at the inner end of the member 7 is a disk-like head 11 which is provided with inner and outer spaced annular flanges 12 and 13, respectively, the same being fitted within companion grooves 14 and 15, respectively, formed in the outer face of the enlarged portion 16 on the coupling sleeve or socketed housing 6, the grooves 14 and 15 in the enlargement 16, being spaced apart, providing therebetween an annular flange 17 which fits between the flanges 12 and 13 on the disk-like head 11 of the member 7 so that in this manner a tongue and groove fitting is had between the member 7 and the enlargement 16 on the socketed housing or coupling sleeve, thereby excluding dust, dirt or other foreign matter from the spindle 5 fitted within the axle skein.

The socketed housing or coupling sleeve 6 can be fastened to the axle bar A in any desirable manner.

From the foregoing description, taken in connection with the accompanying drawing, the construction and operation of the herein described axle skein will be readily apparent and, therefore, a more extended explanation has been omitted.

Having thus described my invention, I claim:

In a device as described, in combination, a coupling sleeve formed with an enlarged cylindrical portion, a tapering spindle extension upon said enlarged portion, an axle box formed at its wider end with a cup-shaped flange the base-portion of which is spaced in back of the inner edge of said axle box whereby the side wall of said cup-shaped flange and the portion of said axle box surrounded thereby form concentric flanges, said enlarged portion being formed with an annular bore around the base-portion of said spindle extension, an annular band formed within said bore upon said enlarged portion so as to be spaced from the side wall of said bore and the outer surface of said spindle extension thereby providing two concentric grooves, said band having its outer end spaced inwardly from the extreme outer face of said enlarged portion, the innermost flange end of said spindle extension fitting one of said grooves while the flange portion of said cup-shaped flange fits the other groove, the base portion of said cup-shaped flange fitting said bore and contacting said band, whereby said bore will be completely closed, and means carried by said spindle extension and engaging said spindle extension for holding the latter against displacement.

In testimony whereof I affix my signature.

JOHN MORRIS.

Copies of this patent may be obtained for five cents each, by addressing the "Commissioner of Patents, Washington, D. C."